United States Patent [19]

Moran

[11] 3,934,228
[45] Jan. 20, 1976

[54] PARALLEL INTERFACE WITH HIGH SPEED PRINTER

[75] Inventor: Paul J. Moran, Waynesboro, Va.

[73] Assignee: General Electric Company, Waynesboro, Va.

[22] Filed: Dec. 10, 1973

[21] Appl. No.: 423,083

Related U.S. Application Data

[63] Continuation of Ser. No. 314,584, Dec. 13, 1972, abandoned.

[52] U.S. Cl. .......................................... 340/172.5
[51] Int. Cl.[2] ........................................ G06F 3/12
[58] Field of Search .............. 340/172.5; 101/93 C

[56] References Cited
UNITED STATES PATENTS

| | | | |
|---|---|---|---|
| 3,303,775 | 2/1967 | Giannuzzi | 101/93 C |
| 3,312,174 | 4/1967 | Cunningham | 101/93 C |
| 3,351,917 | 11/1967 | Shimabukuro | 340/172.5 |
| 3,366,044 | 1/1968 | Marsh, Jr. | 101/93 C |
| 3,470,539 | 9/1969 | Proud, Jr. et al. | 340/172.5 |
| 3,540,004 | 11/1970 | Hansen | 340/172.5 |
| 3,582,897 | 6/1971 | Marsh, Jr. | 340/172.5 |

*Primary Examiner*—Gareth D. Shaw
*Assistant Examiner*—Paul R. Woods

[57] ABSTRACT

Increasing the through-put rate of data processing in an electronic printer by accepting incoming data at a rate which varies inversely with the variable print density of the incoming data being received. The processing of non-printable or non-graphic characters, such as SPACE, associated with the performance of control functions is carried on at a higher rate than is the case for printable or graphic characters.

19 Claims, 5 Drawing Figures

PARALLEL INTERFACE WITH HIGH SPEED PRINTER

This is a continuation of application Ser. No. 314,584 filed Dec. 13, 1972 now abandoned.

INTRODUCTION

The present invention relates to electronic data processing and more particularly to methods and means for increasing the printing rate of electronic printers by varying the processing rate as a function of the print density of data being received from a remote source.

Printing systems are often limited in capability of accepting data from a source to the normal printing speed of the printer. In many such arrangements, no distinction is made between printing and non-printing functions which are desired to be executed. It would be desirable if the printing function could be carried out at the maximum design rate which is usually a built-in limitation — but that the processing of the non-printable characters or the execution of non-printing functions be carried at a higher rate.

A particular application for such a system exists in the case of a cathode ray tube display wherein signals representing printable and non-printable characters are received and utilized to print a picture on the screen or face of the CRT. The incoming data is usually in alpha, numeric or other graphic forms. The data may be presented in the form of writing or a graphic picture, such as a graph, triangle design, etc. If it becomes desirable to provide a hard copy of say, for example, a triangle display, ordinarily one could operate the printer in a conventional mode in which considerable time would be expended in horizontal spacing and vertical line changing before actual graphic marks are printed. Generally speaking, the spacing and character printing operations would be afforded essentially the same time increment for execution and the vertical line changing would be afforded a worst condition time period in order to be executed.

One approach for increasing the through-put rate of data handling is described in U.S. Pat. No. 3,739,350 entitled "High Speed Data processing System" of Paul J. Moran issued June 12, 1973 and assigned to the common assignee. Here input data is normally available from a source at a relatively high rate — for example of the order of 80,000 characters per second wherein each character is defined by a group of coded pulses. A representative code is the ASCII code wherein seven bits uniquely define the character and these bits are preceded by a start bit and one or two stop bits and a parity bit. Each character is thus defined by 10 bits in this example. In the aforesaid application a printer is described whose electronics can accept data and process it electronically for printing at a rate, say 1200 bits per second — but whose actual printing rate, principally due to mechanical time delays, is much slower than the available input data rate. In one example, the printing rate is of the order of 300 bits per second (commonly referred to as 300 BAUD) which translates into 30 characters per second. To increase the throughput of the data input-printer combination, this aforesaid application teaches first sensing the incoming data to distinguish between printable (or graphical characters) and non-printable (or non-graphical) characters which are to be used in performing control functions associated with the graphical characters. Examples of printable characters are A, E, 6, +, etc., whereas non-graphic characters are exemplified by SPACE, LINE FEED, FORM FEED, etc. An identified graphic character causes the transmission of the next following input character to be delayed for a first time interval (for example, 33 milliseconds) which represents the time required for printing of the identified graphic character to take place. An identified non-graphic character, on the other hand, causes the next following input character to be delayed a second time interval (for example, 8.3 milliseconds) which is much shorter and corresponds to the higher electronic, data processing rate (for example, 1200 baud) of the printer. However, since a LINE FEED character (LF) involves a mechanical operation of the duration of the order of 60 milliseconds, and in addition the LF signal may be preceded by a number of printable characters which need to be processed to printing before initiating the LINE FEED, the sensing of a LINE FEED character causes the next following input character to be delayed a third time interval which is variable. This delay may be equal or greater than the second interval and may be greater than the first interval (for example, up to 300 ms) since it is dependent upon the LINE FEED function actually being executed or completed. In this manner non-printable input characters are processed at the maximum electronic data processing rate of the printer.

Another approach for increasing the data throughput of a printer is exemplified by a feature commonly referred to as HORIZONTAL TABULATION. In the aforementioned printer, special horizontal-tab command codes (ie, numbers representing the columns to be indexed to for printing) are programmed and stored in a special memory for use by the printer in connection with data to be received from a data source such as a local keyboard or a remote station. Subsequently when a TAB command code is received from the data source or from the keyboard, the TAB number stored in memory is caused to generate a corresponding number of pulses for indexing the column counter to the stored TAB number so that printing and spacing are ignored in the columns preceding the column count corresponding to the TAB number. This approach of course requires setting of TAB numbers and processing these before indexing the column counter.

While these aforementioned approaches are useful in increasing the data throughput between a high speed data source and a relatively slower speed printer — under certain circumstances an even faster throughput is desired. The problem posed is a complex one, since in the aforementioned type of printer the input data may be available at extremely high rates — such as 80,000 characters per second. The actual electronic processing of the data by the printer including entry of data into the circulating memories of the printer, on the other hand, is designed for a much slower rate, such as 120 characters per second — whereas the actual printing rate may be the same or even lower, say 30 characters per second. Finally, the execution of a non-print function, such as LINE FEED, may require an even longer time duration.

Accordingly, one object of this invention is to provide an improved apparatus for processing digital data comprising signals representing graphical characters for communicating information and also control characters for performing control functions associated with the graphical characters at high rates of speed.

Another object of this invention is to provide an improved method and apparatus for varying the printing speed of an electronic printer inversely as a function of the print density.

Another object of the invention is to provide an improved arrangement for sensing incoming data available in parallel form for printable characters and SPACE function characters and for controlling the processing of the SPACE function characters at a much higher rate than printable characters.

Another object of this invention is to control the rate at which data is accepted such that the data receipt iss delayed a given fixed amount if printable characters are involved, essentially no delay is involved if SPACE function characters are involved, and a variable amount of delay is introduced if a predetermined non-printable character such as LINE FEED is involved where the variable amount depends on the time required to execute the line feed function.

Another object of this invention is to provide an improved data processing method and arrangement.

Briefly, the present invention accomplishes these objects by recognizing a characteristic in certain types of printers which, because of their design, requires circulation of column information in memory along with the associated input data. Such a printer is described in a U.S. Pat. No. 3,803,558 of Clifford M. Jones and Earle B. McDowell and entitled: "Print Selection System", issued Apr. 9, 1974 in the name of the common assignee. The throughput of data is increased by sensing the receipt of a common occurring, special non-printable control function — such as SPACE — and bypassing the normal data processing printer electronics, including the circulating memory, and directly indexing a column counter associated with this memory without delay to indicate the next column count position.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
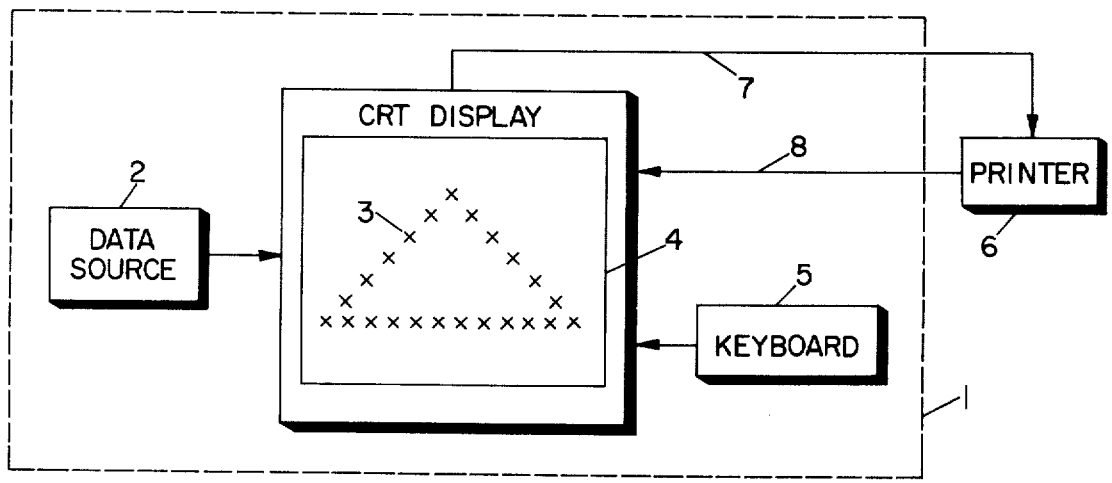
FIG. 1 shows in block diagram form a system involving a CRT display operating with a printer wherein the invention would be applicable.

Referring to FIG. 1, there is shown a data source 1 comprising a CRT display which responds to data available from a source as, for 1 which responds to data available from a source, for 3, on the face of a screen 4 of the CRT. Such display may also be generated in response to operation of a keyboard 5 which generates alphanumeric or graphic symbols for display on the screen of the CRT. In the arrangement as described, it is oftentimes desirable to be able to print under the control of the operator a hard copy of the display appearing on the screen of the CRT. This is illustrated by a printer 6, such as an impact printer, which responds over line 7 to the data representing the display information which is stored in a storage circuit of display 1.

The input data available over line 7 in parallel form may generally be classified as either constituting printable or graphical characters representing information to be printed or communicated or non-printable or control characters for controlling or performing control functions associated with the graphical characters. Representative of printable characters would be alphanumeric characters, punctuation marks, graphic symbols, etc., which are to be printed on a record medium. Representative of non-printable characters would be, for example, SPACE, LINE FEED, FORM FEED, VERTICAL TAB, SHIFT-OUT, SHIFT-IN, and DELETE. These non-printable signals are used to format the printable characters or to make the printing apparatus perform certain associated functions such as bell ring, etc. For purposes of discussion, one may consider use of the USA Standard Code for information interchange (ASCII), wherein binary numbers 0 through 32 and 127 represent the non-printable characters, and binary numbers 33 through 126 represent printable characters. It will be assumed that the data signals are received in binary coded form, for example, in a seven bit code wherein each bit is weighted logic 1 or logic 0. In the discussion, reference will be made to certain codes such as LINE FEED 0101000, SPACE 0000010, VERTICAL TAB 1101000 and FORM FEED 0011000. For reference purposes, use is made of the term "baud" in the application which signifies the number of bits per second at which the data is made available in serial form. For example, 1200 baud would mean that 1200 bits of data are received per second. Oftentimes, 10 bit positions are associated with a serially received character wherein the additional bits may be used to signify the start of a character, the stop of a character and a parity check. To convert a baud rate to a character rate, one merely would divide the baud rate by 10 so that 1200 baud is convertible to mean 120 serial characters per second. Where data is transmitted in parallel form, as will be described hereafter, the start and stop bits are omitted. For simplicity, the parity bit is also omitted from the discussion.

The present invention has application to a printer arrangement wherein a partial line of characters may be simultaneously printed. Reference can be made to U.S. Pat. No. 3,568,183, filed July 9, 1968 by Jacob K. Snell, John J. Larew and Clifford N. Jones and U.S. Pat. No. 3,803,558 issued Apr. 9, 1974 of Clifford M. Jones and Earle B. McDowell for an example of such a printer. Such an arrangement permits a higher printing rate than printers that print only a character at a time. The apparatus for the cited patent utilizes a type carrying belt that carries a number of flexible fingers, each of which has a type character on one end thereof. The number of fingers carried on the belt depends upon the number of characters or symbols the apparatus is to print. The type carried by the belt is continuously passed in a line across a record medium, such as paper. A plurality of hammers are located across a line of the record medium and are selectively operated to impact type fingers into the paper and thereby print up to a plurality of characters simultaneously. The position of each type character relative to a fixed point on the printer is determined by detecting the passage of a particular type character past that point and thereafter triggering a counting mechanism at a rate proportional to the rate of type character movement. As the type characters on the belt move past each possible column position on the recording medium, circuitry compares the instantaneous column position of the type characters on the belt, with the stored input data and the associated column information circulating in a memory to determine whether or not type characters are in position for printing. When this comparison indicates coincidence between characters on the belt and characters to be printed at that column, the hammers at those column positions is actuated and drive the type fingers toward the paper to cause the type face to impress a replica of the character thereon by means of an inked ribbon.

Figure 2:
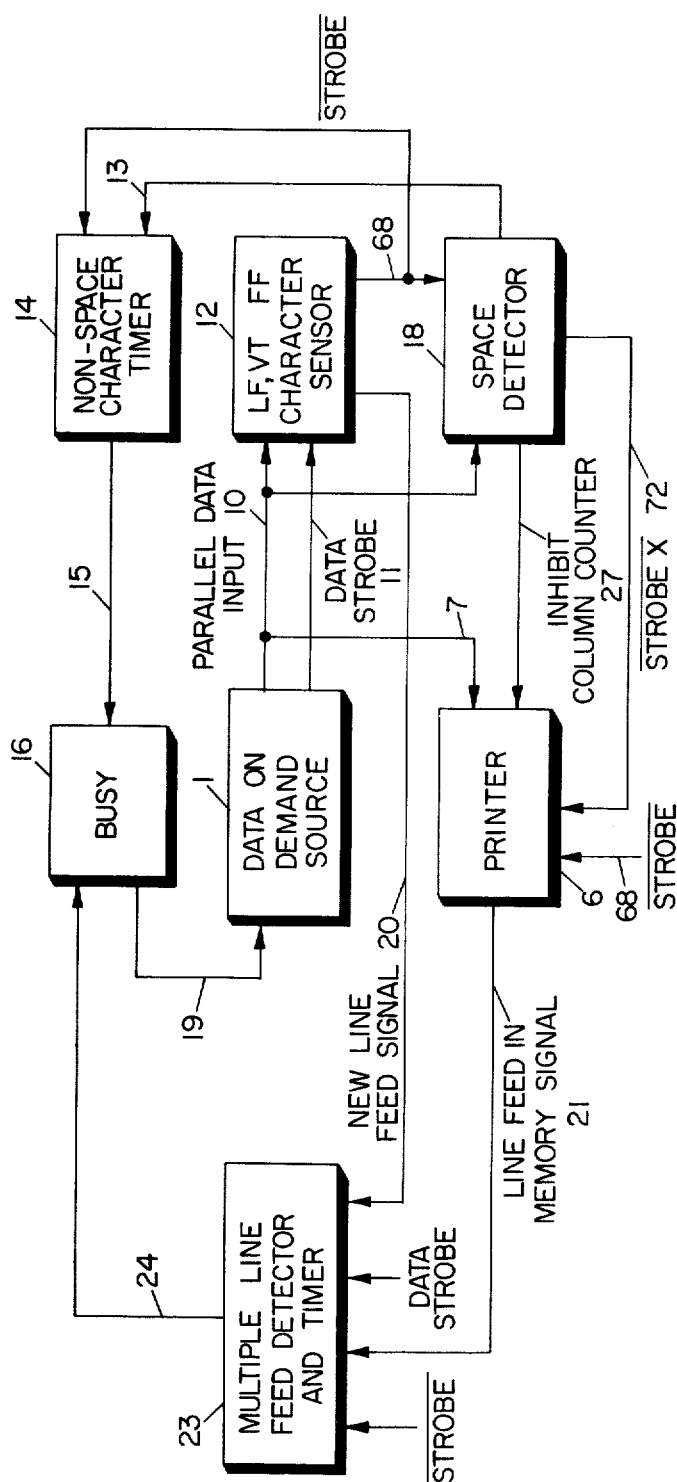
FIG. 2 illustrates in block diagram form one embodiment of the invention.

Referring to FIG. 2, there is shown the circuitry for specially processing common occurring, non-graphic commands such as SPACE represented by the binary number 32. Data available from a data on demand source 1 is to be applied to the printer 6 under the control of circuitry which responds to the density of the printable characters in the data available over lead 10. For purposes of consistency, the data source 1 and printer 6 numerical designations have been retained. The data on demand source 1 may be any well known source, such as a CRT terminal, a digital computer or a tape storage medium which delivers data at its output in the form of digitally encoded pulses in response to demand at a relatively high rate — and terminates the delivery of data when the demand signal is removed. Block 1 is referred to as a data-on-demand source to indicate that the data can be transmitted from the source to the printer at a much faster rate than can be processed by the printer, such as 80,000 characters per second. Data flow from 1 to 6 is controlled by the busy gate 16. This gate normally responds to applied control or busy signals, which shall be described, to develop a gate output on lead 19 at a logic state 1, signaling that the printer is busy and that the transmission of the next character from source 1 to printer 6 should be delayed. Under this condition, no new data is being transmitted to 10. Data is always available from 1 on output lead 10 and the associated lead 7. However, the data is not changed on these leads until the busy gate 16 is operated to a logic 0 output state. A typical source would be a CRT terminal such as the Hazeltine 2000 Terminal which stores a relatively large amount of data in memory. This data is made available character-by-character to a peripheral device in a well known manner. Briefly speaking, a Busy signal is normally applied to the source 1 to prevent data from being presented to the printer. Whenever the printer signals that it is ready to receive the next character, it causes the Busy signal to be removed for a period of time to enable the next character to be accepted by the printer and then the Busy signal is restored, blocking further characters from being presented by the source. This procedure iss carried out until all the characters stored in the terminal have been utilized by the printer. The data on leads 7 and 10 are presented in bit parallel, character serial form, for example, in the ASCII code format previously mentioned. Other signals available from source 1 are data strobe signals of say 12 microseconds duration appearing on lead 11, each of which indicates that the character data on lines 10 and 7 are valid and should be accepted for processing. Let us assume that block 16 normally is blocking or disabling source 1 from sending new data over lead 10 in response to applied control signals which shall be described. Sensor 18 responds to the appearance of a $\overline{\text{STROBE}}$ signal available on 68 to analyze the data available on lead 10 and indicate whether it represents a SPACE command. The $\overline{\text{STROBE}}$ signal is generated for every data strobe signal available on 11 except during certain non-printable character sequences, other than space, which will be described later. If the data constitutes a non-SPACE character, a control signal is sent over lead 13 to the non-SPACE character timer 14. This generates a fixed time duration signal over lead 15 which maintains block 16 in the busy condition for a predetermined time interval, say 8.3 milliseconds, corresponding to the 120 characters per second printing rate of the machine. At the end of that timing period, block 16 goes to its non-busy state sending a signal over 19 calling on source 1 to deliver the next data and data strobe over leads 10 and 11 respectively. Also, SPACE detector 18 responds to a non-SPACE signal on 10 and a $\overline{\text{STROBE}}$ X signal on 72. Printer 6 responds to the STROBE X signal to process the non-SPACE character. If the non-SPACE character is a non-printable character (in the ASCII code being a signal less than a binary 32 as equal to a binary 127) it is necessary to inhibit column counter signal on line 27. If the character sensor in this process should sense a SPACE command character, there is produced an index column counter signal which is applied to the printer 6 over line 27 to advance the column counter in printer 6 by one count. Also the sensing of a SPACE character by 18 prevents the generation of the STROBE X signal which prevents the printer 6 from processing the SPACE character. This will be explained later in detail — but for the present it is sufficient to say that detection of a SPACE signal does not cause circuit 16 to go busy and thus data continues to flow from source 1 without any delays.

In a particular application to be described, the output on lead 19 from 16 controlling the data flow from source 1 constituted a logic level 1 signifying a busy state and blocking source 1 from presenting the next data and associated strobe signal to the printer and a logic level 0 for a non-busy state for enabling source 1 to present the next data and strobe signal to the printer. The printer 6 receives data from source 1 at different rates depending on the printer density of the data, as will be described shortly. This operation results in a higher through-put than would be possible where all characters are processed at the maximum printing rate of the printer. Through-put can be defined as the average number of characters, both printable and non-printable, which can be processed per unit of time by the printer. The printing rate is usually referred to as the maximum rate of printing of printable characters assuming a continuous line of printable characters without SPACE or LINE FEED or DELAYS, etc.

Figure 3:
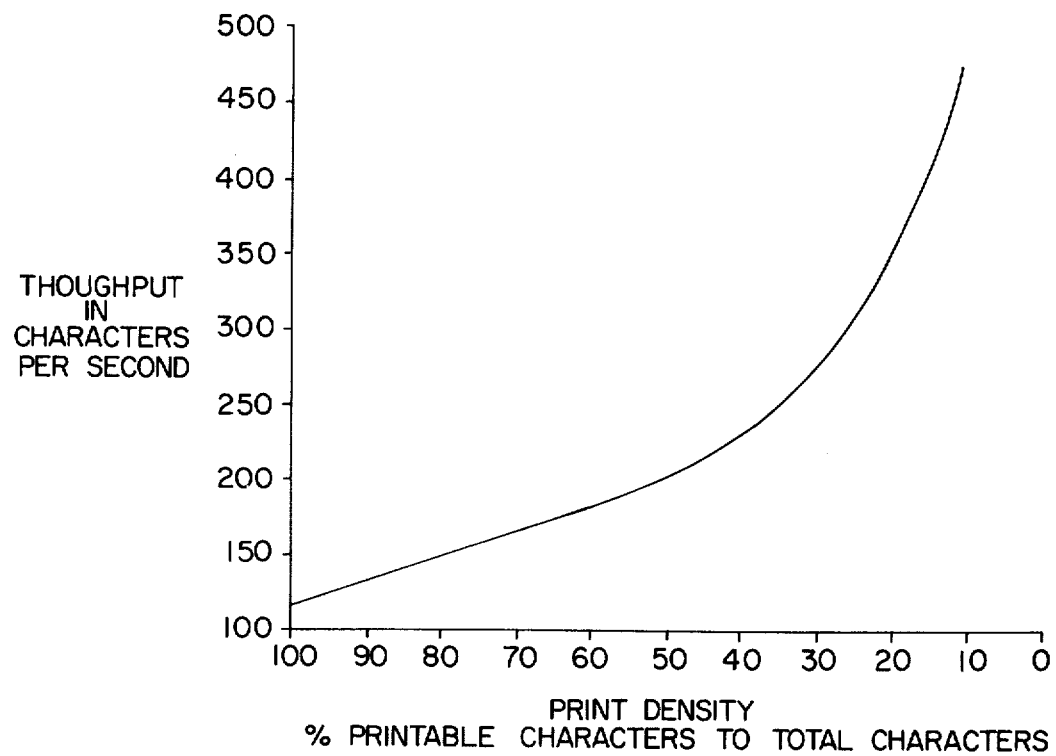
FIG. 3 illustrates in graphical form a feature of the present invention wherein it is desirable to vary the effective speed of printing in terms of characters printed per second as a function of the print density, that is, the ratio of printable to non-printable characters in a communication.
Figure 4:
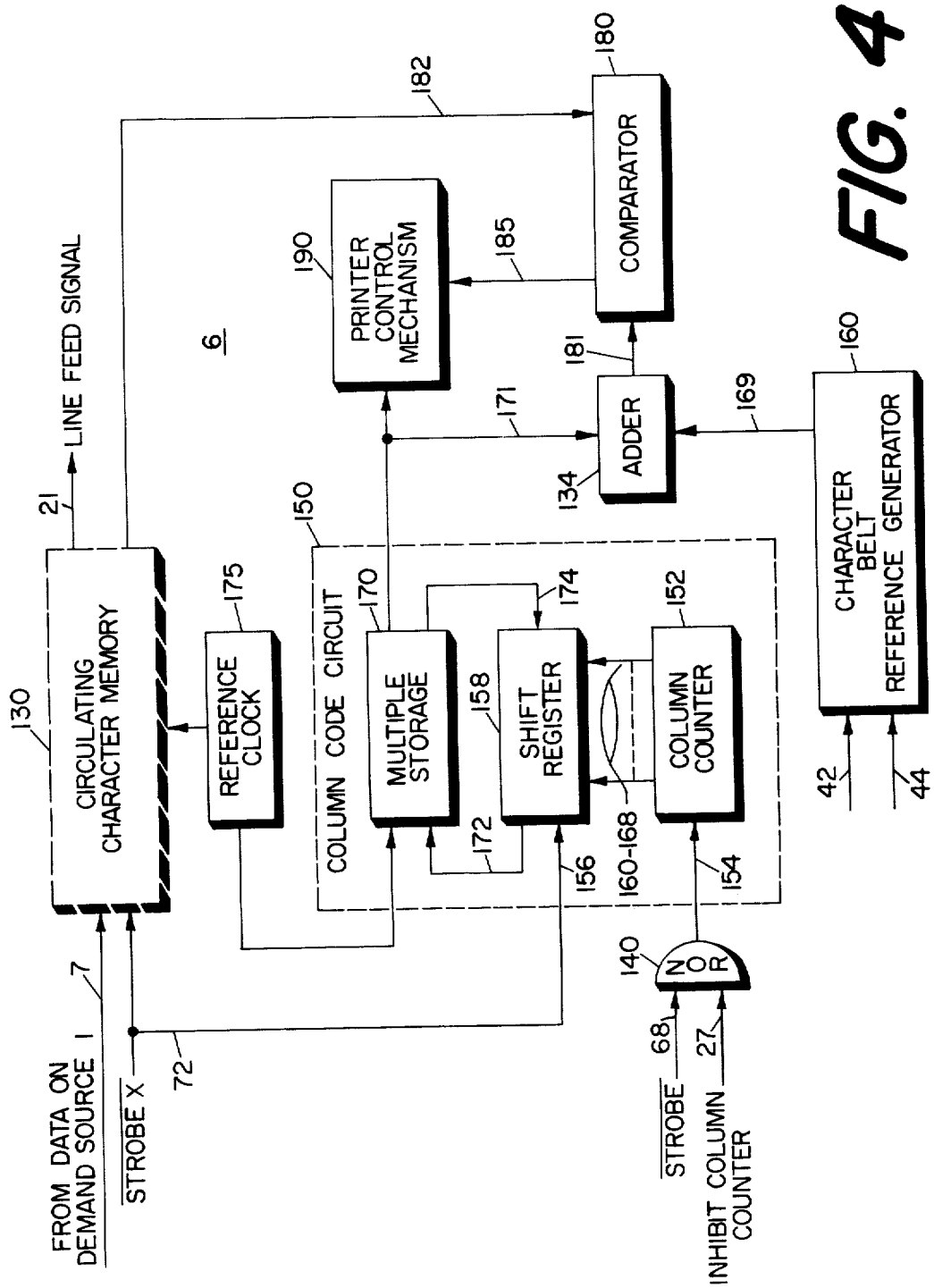
FIGS. 4 and 5 illustrate in diagram form certain details of the invention shown in FIG. 2.

Thus, referring to FIG. 3, it is seen that by providing an arrangement as shown in FIGS. 2 and 4 (to be described), the through-put rate can be increased and varied in accordance with the print density beyond the maximum printing rate which, in the example shown, is 120 characters per second.

The present invention also considers the fact that particular non-printable characters may actually require a greater processing time than a printable character. For example, the non-printable character which results in a LINE FEED may require up to 350 milliseconds to be executed depending on the number of printable characters remaining to be printed before execution of the LINE FEED. The printer has available a new LINE FEED signal and a LINE FEED in memory signal on leads 20 and 21 as shown in FIG. 2. Multiple LINE FEED detector and timer 23 responds to the occurrence of a new LINE FEED signal on 20 while a signal appears on 21 indicating a LINE FEED still exists in memory awaiting execution to initiate a timing signal of variable duration on line 24. The disappearance of the signal on 21 causes 23 to terminate the timing signal appearing on line 24. Since timer 23 is able to produce a longer time delay than timer 14, it will override the signal from 14 and cause the block 16 to remain busy in response to the signal available on lead 24 until the LINE FEED in memory is executed.

In a particular embodiment, no time delay was introduced for the control function of SPACE, timer 14 produced a time delay of 33 milliseconds for executing the printing function and timer 23 produced a time delay which was variable up to 350 milliseconds in accordance with the variable time required to execute the predetermined control functions, such as LINE FEED, VERTICAL TAB or FORM FEED. Thus, the printer 6 receives data at different data rates in accordance with the nature of the data available from the source 1.

For purposes of explanation the present invention is to be further described in detail in conjunction with a particular type of equipment wherein a partial line of characters may be simultaneously printed. Of course, the basic principles of the invention are adaptable to other specific embodiments and such applications will be immediately apparent to those skilled in the art.

In such a printer, a character belt is driven at a substantially constant speed by means such as pulleys and a drive unit. The belt contains a plurality of flexible, type bearing fingers. Each flexible finger contains a type finger comprising a printing character, numeral, legend, etc., at its upper portion. A record medium or paper is driven in the vertical direction. Adjacent the record medium and aligned across one line thereof is an inking ribbon. A plurality of individual hammers are spaced apart from the inking ribbon and are aligned across one line of the record medium. The horizontal position of each hammer corresponds to a column on the recording medium that may register one of the available characters. The character belt is driven with the type fingers or printing characters or elements maintained in alignment between the hammers and the inking ribbon. Thus, each of the printing characters passes by the face of each of the hammers, so that responsive to appropriate correspondence of a desired printing character adjacent a selected column, the appropriate hammer may be energized to cause the printing character to be printed on the record medium at the selected column location. To provide an indication of the instantaneous position of the various type fingers on the moving belt, a start of font and finger count signals are provided. These may be generated in any of several well known ways. For example, by means of photo-sensing, a count signal may be produced for each flexible finger that passes a count reference location and a start of font signal by detecting one of the fingers defining the start of font. Both signals are used in the timing sequence for energizing the proper hammer(s) and they will be referred to again in conjunction with the description of the control arrangement hereinafter.

FIG. 4 is a schematic drawing of a printer logic arrangement in which the present invention may be incorporated. Input data derived from a computer, punched tape, keyboard, etc., is received from Data on Demand Source 1 and made available over conductor 7. The input data may generally be classified as either graphic or printable characters to be printed on a record medium, or non-graphic or non-printable characters such as LINE FEED, SPACE, VERTICAL TAB, FORM FEED, etc., abbreviated respectively as LF, S, VT, and FF. Thus, the latter signals are utilized to perform control functions related to the printing of characters. The present disclosure is concerned primarily with non-graphic commands SPACE which effect the horizontal spacing of type on the record medium. It is assumed that the input information and the special command signals are received in binary coded form; for example, in a seven bit code wherein each bit is weighted. Diagrams 2 and 4 illustrate an arrangement for fulfilling either a first or a second requirement, or both. A detected SPACE signal operates to merely increment a column counter without entering data into memory. A detected non-SPACE, non-printable signal operates to enter the represented character into memory without indexing a column counter. A detected printable signal operates to enter the represented printable character into memory and to also increment the column counter.

As shown in FIG. 4, a circulating character memory 130 receives a STROBE X signal and also the input data in parallel form on line 7. In the ASCII code, the numbers 0–32 and 127 non-printable character commands, of which S, VT, FF, and LF are included and the numbers 33–136 represent the printable characters. The details of Circulating Character Memory 130 are not germane to the present invention. In fact, this is also true of the components and detailed functioning of the Character Belt Reference Generator 160, Adder 134, Comparator 180, and Printer Control Mechanism 190. Reference may be had to the aforecited patent application for a thorough understanding of these units.

In general, Circulating Character Memory 130 may comprise a parallel to serial shift register in series with a plural bit storage unit, such as a recirculating shift register memory. It functions as a recirculating memory unit for storing and circulating the data information corresponding to each character, until that character is printed on the record medium. The Character Belt Reference Generator 160 receives type finger count signals over conductor 44 and start of font signals over conductor 42. It generates binary coded character codes in serial form on lead 169, which represent the particular printing character appearing at a predetermined position (e.g. at column 1) at any instant of time.

The Column Code Circuit 150 includes a Column Counter 152 which receives over 154 $\overline{\text{STROBE}}$ signals, through OR gate 140 provided there is no inhibit column counter signal on 27, and generates parallel output binary coded column signals over the conductors 161–168. In a system which, for example, has provision for eighty columns of printed matter, the column counter 152 will count from 1 to 80 in response to applied signals. The output of Column Counter 152 is applied in parallel to an 8 bit Shift Register 158 under control of $\overline{\text{STROBE}}$ X signals available on 156. The $\overline{\text{STROBE}}$ X signal also controls the entering of data from line 7 into character memory 130. Shift Register 158 is connected to a Multiple Storage until 170 by means of the lines 172 and 174 to form a recirculating column code unit. The coded characters stored in the Circulating Character Memory 130 and the recirculating Column Code Circuit 150 are advanced in synchronism by pulses from a Reference Clock 175.

As fully explained in the aforecited patent applications, the belt code signals on line 169 and the column code signals on line 171 are applied to an Adder 134, which arithmetically adds, character by character, serially, the belt code signal to the column code signal to produce a summation signal over lead 181. A distinct summation signal is produced for each column code signal that is added to a particular belt code signal, and each summation signal effectively provides character position information relating a particular data character to a particular column location. The summation signals are applied over line 181 to one input of Comparator 180 and the output from Circulating Character Memory 130 is applied to another input thereof over line 182. Comparator 180 serially compares one character at a time at a rate sufficiently high to effect comparison of all the data characters stored in Circulating Memory 130 (which may be a full line of 80 characters, for example) during the time it takes for a character on the belt to pass from any given column to an adjacent column. Upon detecting correspondence, a signal is generated over line 185, and applied to the Printer Control Mechanism 190. This signal causes the appropriate hammer on the mechanism to print the desired character. For further details of a hammer firing circuit reference may be made to the aforementioned application Ser. No. 91,160 and U.S. Pat. No. 3,575,107, entitled: "Underspeed and Undervoltage Protection For Printer," dated Apr. 13, 1971 and assigned to the common assignee.

The Column Counter 152 generates coded column integer signals denoting the column to be considered for the printing of a possible character. The coded column integer is advanced by a factor of 1 for each printable character read-in signal applied via NOR gate 140. When a SPACE command signal is received, circuitry to be described generates a pulse and applies it over output lead 27. This pulse is passed by the NOR gate 140 and is applied to the count input of Column Counter 152. Thus, Column Counter 152 will advance the count registered therein (and hence the column being considered for next character printing) by one count. This circuitry to be described also prevents data to be entered into the input data circuit 10 from the Data on Demand Source.

Figure 5:
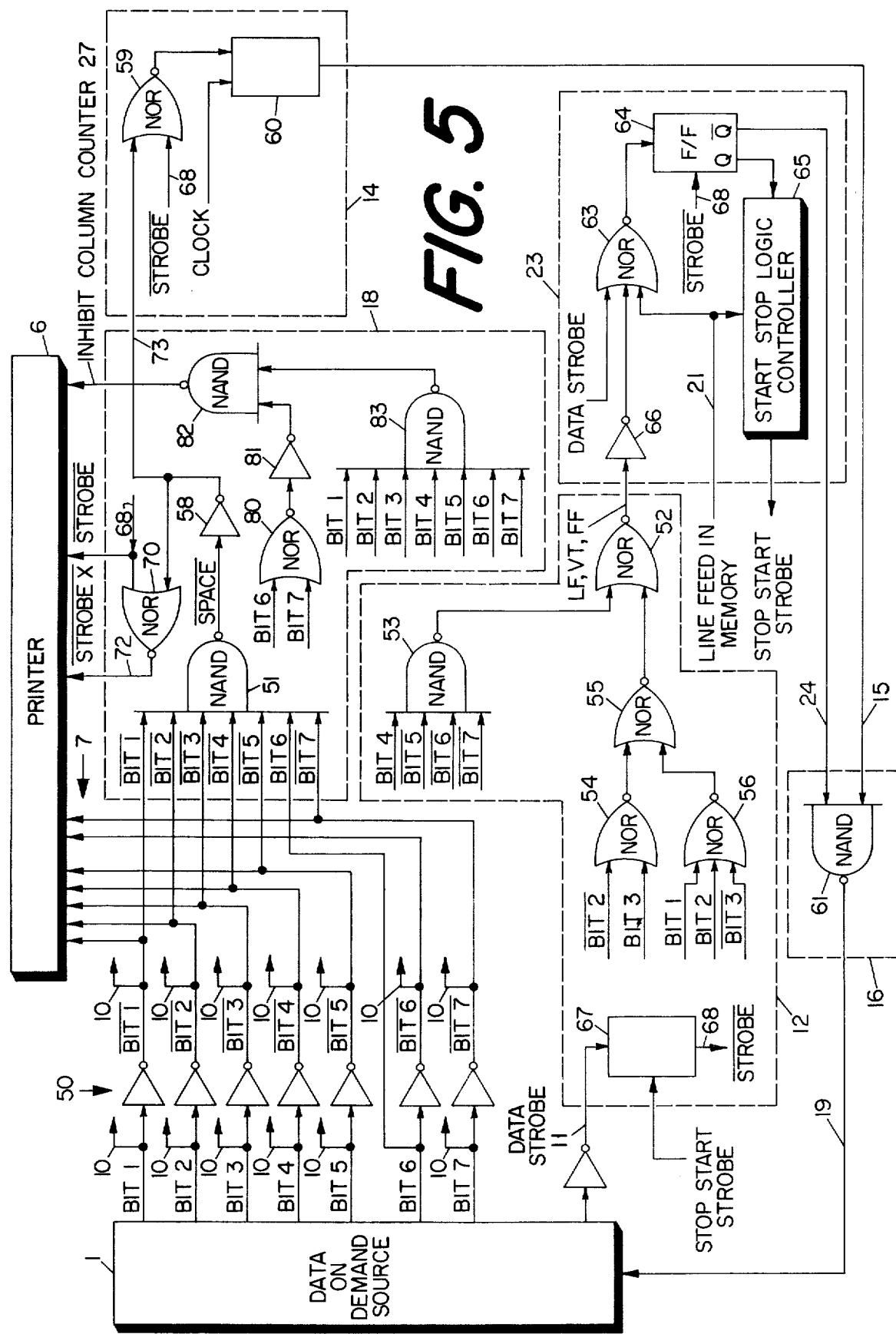

Reference is now made to FIG. 5 for further details of how signals available from source 1 and representing printable and certain non-printable characters are sensed during the data strobe period as defined by the signals on lead 11 and processed in response to the $\overline{\text{STROBE}}$ signal on lead 68. First we shall consider how a SPACE signal is sensed. To provide a level 0 stage at the output of 51 signifying a SPACE signal available from source 1, inverters 50 are provided to invert the signals representing bits 1–5 and bit 7 to provide a reverse code of 1111111 with an input SPACE signal 0000010 coming from source 1. The notation $\overline{\text{BIT}}$ means, for example in the application $\overline{\text{BIT}}$ 1, that if there is not a bit 1 on the associated line, the signal state is 1. A BIT 1 would represent a zero state for the associated line. To provide a level 1 state at the output of 51 signifying a non-SPACE input from source 1, one or more of the inputs to 51 would be at a zero level state.

To provide a level one state at the output of NOR gate 52 signifying a LF, VT, or FF signal available from source 1, both inputs to 52 would need to be zero state. Before describing how this may be accomplished, the following discussion will be helpful. An analysis of the ASCII codes for LF, VT, or FF indicates the following code patterns 0101000, 1101000 and 0011000 respectively. It should be noted that bit 4–7 positions are the same and hence can be decoded by NAND gate 53 to provide the zero state signal to 52. For this condition, the inputs to 53 need to be at the level 1 state and this is accomplished by coupling the BIT 4, $\overline{\text{BIT 5}}$, $\overline{\text{BIT 6}}$ and $\overline{\text{BIT 7}}$ terminals from source 1 or inverter 50 as required. A zero state signal on any input to 53 would indicate a non-LF, non-VT, or non-FF signal in the bit 4–7 positions. Gate 56 is provided to sense a FF signal and gate 54 is provided to sense a LF or VT signal. Since a FF has codes 001 in the first 3 bit positions, NOR gate 56 output will go to state 1 if the input connections thereto are made to BIT 1, BIT 2 and $\overline{\text{BIT 3}}$ terminals of source 1 or inverters 50 as required. When the output of 56 goes to a 1, it causes 55 output to go to zero which is the other signal input to 52 required to sense a FF. Since LF and VT have the same codes for bit 2 and bit 3 positions, ie 10, we can resolve LF and VT from FF without considering the bit 1 position at gate 54. Gate 54 will go to state 1 if the input connections thereto are made to $\overline{\text{BIT 2}}$ and BIT 3 terminals of sources 1 or inverters 50 as required. When the output of 54 goes to a 1, it causes the output of 55 to go to zero which is the other signal input to 52 required to sense a LF or VT.

Thus far we have described how to identify SPACE, LF, VT and FF signal inputs or their absences. Source 1 provides a $\overline{\text{DATA STROBE}}$ signal which is inverted to a DATA STROBE signal on 11 to indicate that data available on line 10 is valid and ready for acceptance other than special situations to be described later. In the absence of a stop strobe signal available from 65, a $\overline{\text{STROBE}}$ signal is produced at the output of a gate 67 for every $\overline{\text{DATA STROBE}}$ signal generated by Source 1. For all detected characters other than a SPACE, it is desired to generate a $\overline{\text{STROBE}}$ X signal on line 72 which will enter those characters into the character and column memories. A detected non-SPACE character results in line 73 being at logic level 0. At the occurrence of $\overline{\text{STROBE}}$, both inputs to NOR gate 70 are at logic 0, results in a $\overline{\text{STROBE}}$ X signal at logic level 1 being developed on line 72 as required. The $\overline{\text{STROBE}}$ signal developed on 68 would also index the column counter 152 provided the character is a printable character or a SPACE character as determined by 82. The determination of a printable character is accomplished as follows. A non-printable, non-SPACE character is defined by a binary number less than 32 or equal to 127. In the ASCII code the absence of BIT 6 and BIT 7 signifies a binary number less than 32. Under these conditions NOR gate 80 has a logic 1 at its output, which results in a logic 1 on line 27 after passage through inverter 81 and NAND gate 82. This logic 1 applied to NOR gate 140 of FIG. 4 blocks the $\overline{\text{STROBE}}$ signal and thus inhibits a count change. In the ASCII code binary 127 is represented by a logic 1 on all seven bit positions. NAND gate 83 output goes to logic 0 for this condition and produces a logic 1 at the output of NAND gate 82. Again this inhibits indexing of the column counter 152.

If a SPACE signal is sensed, the column counter is indexed in the printer by the output of 82 and 67 but the character is not entered into memory as explained in FIG. 3 because of the absence of a $\overline{\text{STROBE X}}$ signal at the output of 70. To do this the generation of $\overline{\text{STROBE X}}$ is inhibited by the presence of SPACE signal on 73 at logic 1. NOR gate 70 responds to this to produce a logic 0 at its output on lead 72. For a SPACE character, the inhibit column counter signal is absent on lead 27, thereby permitting the column counter to be indexed at $\overline{\text{STROBE}}$ time.

The control of busy gate 16 will now be described. If the output of NAND gate 51 is a 1 indicating that a non-SPACE, ie a $\overline{\text{SPACE}}$, signal is being received, inverter 58 converts this to a zero state signal at NOR gate 59. NOR gate 59 responds to the level zero state signal available from 58 and the zero level state signal representing a $\overline{\text{STROBE}}$ input to produce an output signal at the level 1 state for application to a flip-flop 60. Flip-flop 60 operates as a timer to produce on its output lead an 8.3 millisecond duration timing pulse at the appropriate clock time established by the input signal labeled clock under the conditions of a non-SPACE signal. This timing pulse is applied over lead 15 to the busy circuitry 16. NAND gate 61 normally has a 1 level state signal on one of its inputs which will be described shortly, and under these conditions with the 8.3 millisecond pulse being developed by 60 at the level 1 state, it produces an output signal on lead 19 which blocks the transfer of further data from the source to the printer and the character sensors for the 8.3 millisecond duration. At the end of the 8.3 millisecond time interval the source 1 resumes its transmission of data. In the event the output of 51 indicates a SPACE signal, then NOR gate 59 is blocked preventing 60 from generating a delay signal for delaying the transfer of new data from source 1 to lines 10 and 7.

As previously described, circuitry 12 operates to sense the input data available from the source 1 to indicate a LINE FEED, VERTICAL TAB or FORM FEED character is available from source 1 for utilization by the printer. If any of these characters occur, the output of NOR gate 52 is a one state signal which is inverted in 66 to a zero state. If on lead 21 a signal is received indicating that a LINE FEED command is in memory and waiting the completion of execution, signified by a logic 0 state, then the NOR gate 63 responds to these inputs at the occurrence of the data strobe signal at its input, also at a logic 0 state, to produce an output signal at the logic 1 state. The flip-flop 64 responds to the logic 1 signal being generated at its set input lead to produce a zero level signal at its Q bar output lead for application to NAND gate 61. An output is also delivered at its Q output at the logic 1 state. Logic circuit 65 responds to the logic 1 signal from 64 and the logic 0 level input signal indicating that a line feed is in memory to produce an output signal START STOP STROBE at a logic 0 state which is applied to the strobe control circuit 67 to block the generation of a strobe bar signal at the output thereof. The START STOP LOGIC controller 65 is a gate circuit arrangement similar to the circuit comprising NAND gate 82, inverter 81 and the output lead from NAND gate 83 for producing an INHIBIT signal. The START STOP LOGIC controller 65 comprises a NAND gate for producing a STOP START STROBE wherein the output of flip flop 64 is applied as one input to the NAND gate and an inverter as an element of START STOP LOGIC controller 65 applies the signal from lead 21 as the second input to the NAND gate. NAND gate 61 responds to the zero state input signals available from 64 and 60 to produce at its output a blocking signal for the data transmission until when the line feed in memory signal changes to a one state indicating the line feed in memory has been executed. Circuit 65 responds to produce a logic 1 signal for application to 67 which produces a strobe bar output signal. This strobe bar signal resets flip-flop 64 so that it is available again for resolving the condition when there is an unexecuted line feed in memory and another line feed signal is presented by the data source 1. The strobe bar signal developed by 67 is also applied to the printer over lead 68 to process the line feed which has been held up on the output leads of source 1. In a particular embodiment, as previously referenced, signals representing printable and non-printable characters are applied to a circulating character memory, such as 130. When a line feed signal is received, an identification is provided for signals stored after receipt of the line feed signal. Means are provided to inhibit printing of characters corresponding to the identified signals and also to inhibit the printer from responding to the line feed signal until the signals stored by the printer before receipt of a LINE FEED signal have been printed. The aforesaid identification is removed after the LINE FEED signal has been executed and the related signals permitted to be printed. The LINE FEED signal, as well as the FORM FEED and VERTICAL TAB signals are entered into the circulating memory as a convenience but are treated, because they are represented by binary numbers less than 32, as non-print characters and are written over in memory by succeeding printable characters. However the LINE FEED, FORM FEED or VERTICAL TAB signals are stored in memory, as for example by setting a flip-flop circuit, and the flip-flop circuit is reset upon execution of the stored signal. Thus while the drawings, for example FIG. 2, specifically refer to a LINE FEED IN MEMORY signal and NEW LINE FEED signal as available on lines 21 and 20, the VERTICAL TAB and FORM FEED signals supplied by Source 1 may also operate to control circuitry 23 in a manner similar to that effected by a LINE FEED signal. The details of this circuitry form no part of this invention. Reference may be made to copending application Ser. No. 95,967 entitled: "Line Feed Print Inhibit System", filed Dec. 7, 1970 and assigned to the common assignee for further details.

What I claim as new and desire to secure by Letters Patent of the United States is:

1. Apparatus for controlling the processing of output signals presented sequentially from a source and related to printing wherein said output signals comprise coded signal representing printable characters to be printed and SPACE commands to control the spacing of characters to be printed, said apparatus comprising,
   a memory and a column counter associated with said memory,
   means for sensing said presented signals to identify such signals as representing printable characters or SPACE commands, means for storing sensed signals identified as representing printable characters but not sensed signals identified as representing SPACE commands in said memory,
   means for changing the count state of said column counter by a given count in response to each sensed signal identified as representing a printable character or SPACE command to produce count indicating signals, means coupled to said column counter for storing in said memory a count indicating signal corresponding to each change in count of said column counter associated with a sensed signal identified as representing a printable character but not a sensed signal identified as representing a SPACE command, means coupled to said source and responsive to a sensed signal identified as representing a printable character but not a SPACE command for delaying, by a first time interval, the presentation from said source of a subsequent occurring output signal, and means coupled to said source and responsive to a sensed signal identified as representing a SPACE command for storing in said memory a sensed signal identified as representing a printable character without said first time interval delay.

2. An arrangement according to claim 1 comprising a source of circulating signals representing print characters, and means for comparing said last named signals and said stored count indicating and stored printable signals to provide print control signals to control printing of characters represented by said circulating signals.

3. An arrangement according to claim 1 comprising means for sensing further signals in said output signals representing a non-printing function other than a SPACE function, means responsive to sensed further signals for enabling said arrangement to execute the associated non-printing function, means responsive to the second of two sensed further signals when the non-printing function represented by the first of said two sensed further signals has not been executed for delaying processing of any output signals following said second of two sensed further signals until said last named non-printing function is executed.

4. An arrangement according to claim 3 wherein said further signals comprise LINE FEED signals for changing the line on which characters are to be printed.

5. An arrangement for controlling the processing of output signals sequentially available from a first source and related to printing wherein said output signals represent printable characters and SPACE commands, comprising, a second source of print signals representing print characters, means for sensing a characteristic of said output signals to identify said sensed signals as representing printable characters or SPACE commands, a memory and a column counter associated with said memory, means responsive to a plurality of sensed signals identified as representing printable characters for storing said sensed signals in said memory and means for changing said column counter by a given count in response to each such sensed signal, means for producing account indicating signal in response to each such a change in count of said column counter, means for storing said count indicating signals in said memory, means for changing said column counter by a given count in response to each sensed signal identified as representing a SPACE command without storing in said memory said last named, sensed signal or a count indicating signal corresponding to a change in count of said column counter associated with said last named sensed signal, means coupled to said first source and responsive to a sensed signal representing an output signal other than a SPACE command for delaying the availability of a subsequent output signal from said first source by a first time interval, means coupled to said first source and responsive to a sensed signal representing a SPACE command for making a following signal available from said first source substantially without a substantial time delay, means for comparing said stored sensed signals, stored count indicating signals and said print signals, and means responsive to a given comparison of said compared signals for controlling printing of print characters represented by said print signals.

6. In combination, a first source of sequentially available, first signals to be processed, said signals comprising SPACE commands, printable characters and further signals, a second source of second signals representing the identity and location of moving print characters, means coupled to said first source for sensing a characteristic of said first signals to identify said sensed signals as representing SPACE commands, printable characters, or further signals, a memory and a column counter associated with said memory, means responsive to a sensed signal identified as representing a printable character for storing an indication thereof in said memory, means for changing the count state of said column counter by a given count in response to said last named sensed signal, means for producing a count indicating signal in response to said change in count state of said column counter, means for storing said count indicating signal in said memory, means for comparing said stored indication and said second signals to provide a comparison result signal, means responsive to a given comparison result signal for controlling printing by said print characters of the character corresponding to said stored indications, means coupled to said first source and responsive to a sensed first signal representing other than a SPACE command for delaying the availability of a subsequent first signal from said first source, means for changing the state of said column counter by a given count in response to a sensed signal representing a SPACE command, without storing in said memory, said sensed signal or a count indicating signal corresponding to a change in count of said column counter associated with said sensed signal, and means coupled to said first source and responsive to a sensed signal identified as representing a SPACE command for making a following signal available from said first source substantially without a time delay.

7. An arrangement according to claim 6 wherein said further signals comprise signals representing LINE FEED commands and means responsive to sensed signals identified as representing LINE FEED commands for storing indications thereof in said memory, means responsive to a LINE FEED indication stored in memory for executing a LINE FEED, means coupled to said first source responsive to a sensed second occurring signal identified as representing a LINE FEED command when a first occurring LINE FEED indication is in memory and the execution of the corresponding LINE FEED has not been completed for delaying the availability of subsequent first signals from said first source following said sensed second occurring signal until the execution of said corresponding LINE FEED has been completed.

8. In an arrangement wherein first signals representing SPACE commands, printable characters and further signals available from a first source are processed with second signals representing print characters available from a second source by comparing said first signals representing printable characters and said second signals and controlling printing by said print characters of characters corresponding to said first signals in response to a given comparison of said first and said second signals, a control arrangement comprising means for coupling to said first source for sensing a characteristic of said first signals to identify said sensed signals as representing SPACE commands, printable characters, or further signals, a memory and a column counter associated with said memory, means responsive to a sensed signal identified as representing a printable character for storing an indication thereof in said memory, means for changing the count state of said columnn counter by a given count in response to column last named sensed signal to produce count indicating signals, means coupled to said column counter for storing in said memory a count indicating signal corresponding to each change in count state of said column counter, means for coupling to said first source and responsive to a sensed signal representing other than a SPACE command for delaying the availability of a subsequent first signal from said first source, means for changing the count state of said column counter by a given count in response to a sensed representing a SPACE command, without storing in said memory said sensed last named signal or a count indicating signal corresponding to a change in count of said column counter associated with said last named sensed signal, and means for coupling to said first source responsive to a first signal representing a SPACE command for making the first signal following said sensed SPACE command available from said first source substantially without a time delay.

9. An arrangement according to claim 8 wherein said further signals comprise signals representing LINE FEED commands and means responsive to sensed signals identified as representing LINE FEED commands for storing indications of said last named signals in said memory, means responsive to a LINE FEED indication stored in memory for effecting the execution of a LINE FEED, and means for coupling to said first source responsive to a sensed second occurring signal representing a LINE FEED command when the execution of a LINE FEED corresponding to a stored LINE FEED indication has not been completed for delaying the availability of subsequent first signals from said first source until such execution has been completed.

10. Apparatus for procesing first signals sequentially available from a source for utilization by a printer to effect printing wherein said printer comprises a memory and a column counter associated with said memory, and said first signals represent SPACE commands and other signals including printable characters, said apparatus comprising, means for sensing a characteristic of said first signals to identify said sensed signals as representing SPACE commands or other signals including printable characters, means for normally enabling said printer to continuously utilize sensed, first signals, means for storing an indication of a sensed signal representing a printable character in said memory, means for changing the count state of said column counter by a given count in response to said last named stored indication, means coupled to said counter for producing a count indicating signal corresponding to said change in count of said column counter, and means for storing said count indicating signal in said memory, means responsive to a sensed signal which does not represent a SPACE command for blocking the utilization by said printer of a following first signal for a first time interval, and means for changing the count state of said column counter by a given count in response to each sensed signal representing a SPACE command without storing in said memory said last named sensed signal or a count indicating signal corresponding to a change in count of said column counter associated with said last named sensed signal.

11. Apparatus for processing first signals sequentially available from a source for utilization by a printer to effect printing wherein said printer comprises a memory and a column counter associated with said memory, and said signals comprise signals representing printable characters and SPACE commands, wherein said apparatus comprises, means for sensing a characteristic of said first signals to identify said sensed signals as representing SPACE commands or printable characters, means responsive to sensed signals identified as representing printable characters for storing indications thereof in said memory, means for changing the count state of said column counter by a given count in response to each said last named stored indication to produce count indicating signals, means coupled to said column counter for storing in said memory count indicating signals corresponding to the changes in count of said column counter, means responsive to the sensing of a signal representing a printable character for delaying, by a given time interval, the processing of a subsequent first signal, means for changing the state of said column counter by a given count in response to each sensed signal representing a SPACE command, without storing in said memory an indication of said last named signal or a count indicating signal corresponding to the count of said column counter associated with said last named sensed signal, and means responsive to a sensed signal identified as representing a SPACE command for storing an indication of a sensed signal representing a printable character occurring immediately subsequent to said sensed signal representing a SPACE command substantially without a time delay.

12. In an arrangement for processing first signals available from a source related to printing wherein said signals comprise signals representing printable characters or SPACE commands, means for sensing a characteristic of said first signals to identify said sensed signals as representing SPACE commands or other signals, a memory and a column counter associated with said memory, means for storing indications of sensed other signals in said memory, means for changing said column counter by a given count in response to each said last named stored indication, means for producing and storing in said memory a count indicating signal corresponding to the change in count of said column counter, means responsive to each sensed signal representing another signal for delaying the storing of an indication of the following sensed first signal by a given time interval, means for changing the state of said column counter by a given count in response to each sensed signal representing a SPACE command, means for blocking the storing in said memory of said last named sensed signal or a count indicating signal corresponding to the count of said column counter associated with said last named sensed signal, and means for storing an indication of a sensed signal representing another signal following a sensed signal representing a SPACE command substantially without a time delay.

13. In an arrangement wherein signals representing graphical characters and control characters including a special control character are sequentially presented in bit parallel, character serial form from a source to a printer, means responsive to a presented signal for sensing such signal to identify it as representing a control character other than a special control character, means for delaying presentation of the next signal to said printer for a given time period to permit printer execution of the control function associated with said signal representing such control character, means responsive to a presented signal for sensing such signal to identify it as representing a graphical character, means for delaying presentation of the next signal to said printer for a given time period to permit printing of said graphical character, means responsive to a presented signal for sensing such signal to identify it as representing said special control character, and means for enabling presentation of the next signal to said printer substantially without delay.

14. In an arrangement wherein binary signals representing graphical characters and control characters are presented in bit parallel, character serial form from a source to a printer at a given rate and a strobe signal is presented to indicate when each of such binary signals is to be processed by the printer, means responsive to receipt of a presented storbe signal for analyzing the binary states of the associated presented signal to provide a signal identifying such signal as representing a printable character, a first control character, or a second control character, means responsive to a first control character identifying signal for delaying presentation of the next character for a first time period to permit execution of the control function associated with said first control character, means responsive to a printable character identifying signal for delaying presentation of the next character for said first time period to permit printing of said graphical character, means responsive to a second control character identifying signal for enabling presentation of the next character substantially as said given rate, and means responsive to a further first control character identifying signal to extend a first time delay period initiated in response to the previously received, first control character identifying signal to enable the execution of the control function corresponding to such last named signal to be completed.

15. An arrangement for controlling the processing of data signals available at a given rate sequentially from a source incident to utilization by a printer wherein said data signals comprise signals representing SPACE commands, printable characters, and first and second control characters and wherein said printer comprises a memory and an associated column counter comprising means for sensing a characteristic of said available data signals to identify such sensed signals as representing SPACE commands, printable characters, first non-printable control signals, or second non-printable control signals, means coupled between said source and printer and responsive to a sensed signal other than one representing a SPACE command for enabling said printer to store the corresponding data signal in memory, means coupled between said source and printer and responsive to sensed signals representing a first, or second control character or SPACE command for enabling said printer to utilize said signal for executing the control function corresponding thereto, means coupled to said source and responsive to a sensed signal other than a signal representing a SPACE command for delaying by a first time interval the availability from said source of the data signal immediately following said last named sensed signal, means responsive only to a signal representing a sensed SPACE command or a printable character for changing the state of said column counter by a given count, means responsive only to a sensed signal representing other than a SPACE command for storing in said memory an indication corresponding to the count of said counter, and means responsive to a sensed signal representing a further second signal for extending a first time delay interval initiated in response to the previously sensed signal representing a second signal to enable the execution of the control function corresponding to such last named sensed signal to be completed.

16. In an arrangement wherein signals representing graphical characters, first control characters, second control characters and third control characters are presented from a source to a printer and said printer comprises means for printing said graphical characters and means for executing the control functions represented by said control characters, means for analyzing said presented signals, means responsive to the presentation of a signal analyzed as representing a graphical character for delaying presentation of the next signal for a first delay period to permit printing of the graphical character represented by said signal, means responsive to presentation of a signal analyzed as representing a first or second control character for delaying presentation of the next signal for a second delay period to permit execution of the control function associated with the signal representing said first or second control character, respectively, means responsive to a presentation of a signal analyzed as representing a second control character for extending a second time delay period initiated in response to a previously presented signal representing a second control character to permit the execution of the control function associated with the signal representing such last named control character to be completed, and means responsive to presentation of a signal analyzed as representing a third control character to permit presentation of the next signal from said source to said printer without introducing a time delay.

17. An arrangement according to claim 16 wherein said first and second time delay periods are the same.

18. An arrangement according to claim 16 wherein said printer comprises a memory and an associated column counter,
- means responsive to a presented signal analyzed as representing a graphical character for changing the state of said column counter by a given count,
- means coupled to said memory for storing in said memory an indication of said last named signal and the corresponding count of said counter,
- means responsive to a presented signal analyzed as representing a third character for changing the state of said counter by a given count without storing in said memory an indication of such third character or the corresponding count of said counter,
- and means responsive to said indications stored in said memory to enable printing of presented signals representing graphical characters.

19. An arrangement for controlling the processing of data signals available at a given rate sequentially from a source incident to utilization by a printer wherein said data signals comprise signals representing SPACE commands, printable characters, first control characters and second control characters and wherein said printer comprises a memory and an associated column counter comprising, means for sensing said available data signals to identify such sensed signals as representing SPACE commands, printable characters, first control characters, or second control characters,
- means responsive to a sensed signal representing other than a SPACE command for enabling said printer to store said signal in memory,
- means responsive to a sensed signal representing a first character, second character or SPACE command for enabling said printer to utilize said signal for executing the control function corresponding thereto,
- means responsive to a sensed signal representing other than a SPACE command for delaying by a first time interval the availability from said source of the data signal immediately following said sensed signal,
- means responsive only to a sensed signal representing a SPACE command or a printable character for enabling said printer to change the state of said column counter by a given count,
- means responsive only to a sensed signal representing other than a SPACE command for storing in said memory an indication corresponding to the count of said counter,
- and means for extending said first time delay interval initiated in response to sensing of a signal representing other than a SPACE command until the execution of the control function corresponding to a previously utilized sensed signal representing a control character has been completed.

* * * * *

UNITED STATES PATENT OFFICE
CERTIFICATE OF CORRECTION

PATENT NO. : 3,934,228
DATED : January 20, 1976
INVENTOR(S) : Paul J. Moran

It is certified that error appears in the above-identified patent and that said Letters Patent are hereby corrected as shown below:

Col. 3, line 12, cancel "iss" and insert -- is --

Col. 3, lines 63-65, after "CRT display" insert -- 1 --
           cancel "as, for 1 which responds to data available from a source, for" and insert
           -- for example, 2, for displaying such data as a graphical display --
    line 66, cancel "display" and insert -- displays --

Col. 5, line 60, cancel "iss" and insert -- is --

Col. 6, line 23, before "X signal on 72." insert -- signal on 68 to produce a STROBE --

Col. 12, line 56, cancel "signal" and insert -- signals --

Col. 13, line 61, cancel "account" and insert -- a count --

Col. 14, line 13, cancel "substantial"

Col. 15, line 35, cancel "columnn" and insert -- column --

Col. 17, line 58, cancel "aal" and insert -- al --

Signed and Sealed this

Tenth Day of May 1977

[SEAL]

*Attest:*

RUTH C. MASON
*Attesting Officer*

C. MARSHALL DANN
*Commissioner of Patents and Trademarks*